Patented June 25, 1929.

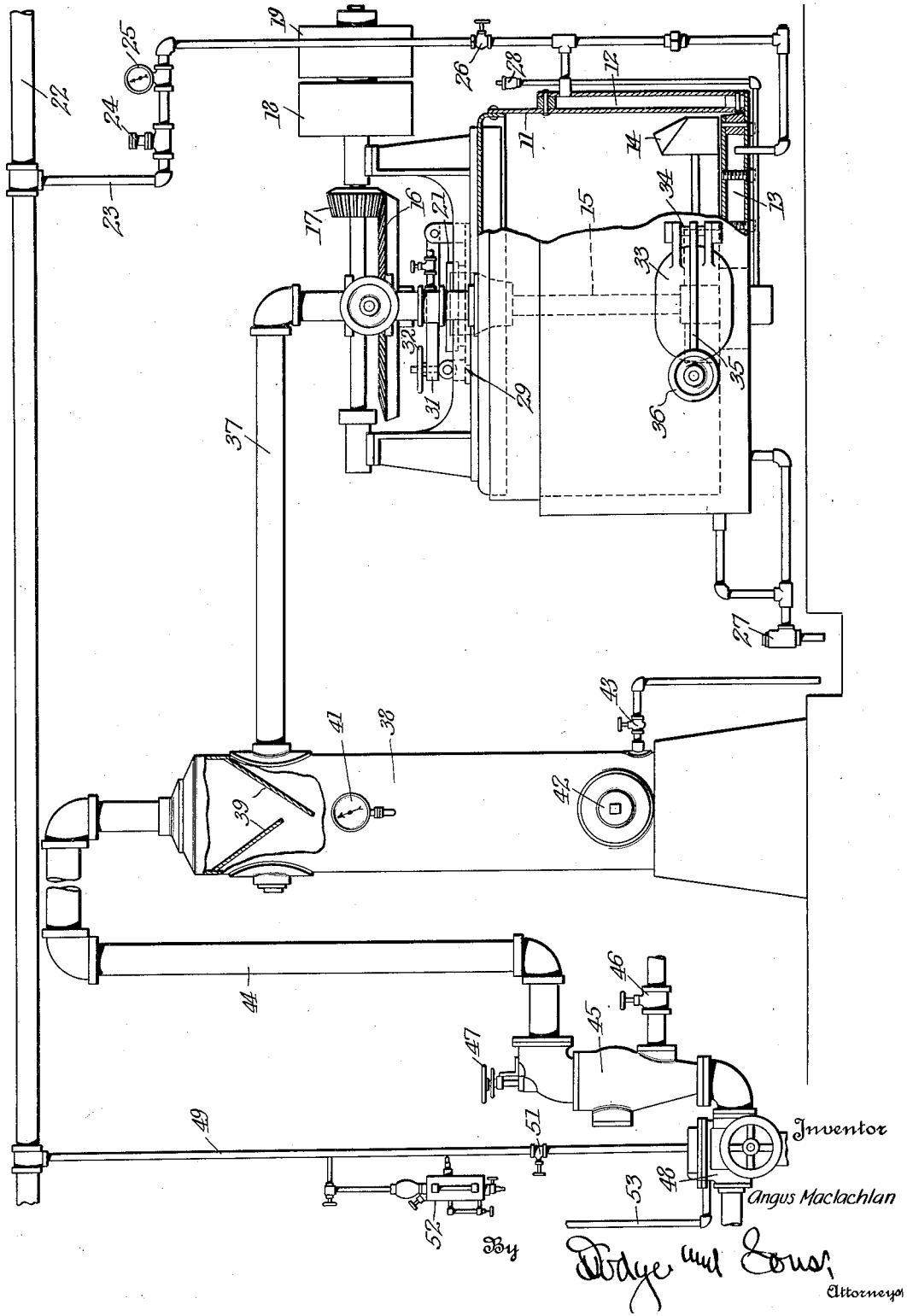

1,718,297

UNITED STATES PATENT OFFICE.

ANGUS MACLACHLAN, OF METUCHEN, NEW JERSEY, ASSIGNOR TO THE AMERICAN BY-PRODUCT MACHINERY COMPANY, OF NEW YORK, N. Y., A CORPORATION OF NEW YORK.

PROCESS FOR PRODUCING FERTILIZER AND THE RESULTING PRODUCT.

Application filed May 12, 1927. Serial No. 190,844.

This invention relates to a method of producing fertilizer and the resulting product, and the chief novelty resides in the chemical and drying treatment used with waste products high in casein and hence characterized by a sticky consistency resistant to effective drying when subjected to heat. Examples of such casein bearing waste are manure from milk-feeding poultry pens, and casein freshly precipitated from skim milk.

In commercial practice poultry is fattened upon butter-milk and other milk products, and the manure collected from the fattening pens carries large quantities of undigested casein. As collected this has been fermented and has the sticky consistency and ammoniacal odor of partially ripened cheese. This manure possesses valuable fertilizing properties, but efforts to reduce it to a dry condition suitable for use on a commercial basis and without material loss of fertilizing qualities have failed. When heated it melts into a sticky mass which cannot be dried by ordinary treatments.

According to the present invention, casein-bearing wastes, such as the poultry manure above described, is treated with an acid or an acid salt and heat, to coagulate and dehydrate the gummy mass of casein. As a result a granular consistency is assumed, which upon the continued application of heat is desiccated to a dry hard mass capable of being pulverized.

It is convenient, however, to use an acid salt, preferably acid sodium sulfate (commercial nitre cake) as the acid reagent.

To further facilitate the drying, use another waste product and improve the resulting fertilizer, there is added to the manure before desiccation a quantity of feathers, which alone or with a quantity of dead poultry are dissolved in a solution of an alkaline sulfide, such as sodium sulfide. The effect is to increase the available nitrogen in the resulting fertilizer, and the mixture is susceptible of drying in a single operation.

In order that the entire process may be fully understood, appropriate apparatus for use in practicing it is illustrated in the accompanying drawing which shows in elevation and partial section the heated drier and mixer, the jet condenser and pump for establishing sub-atmospheric pressure in the drier, and a catch-all or trap interposed between the drier and condenser.

The drier comprises an air tight cylindrical drum 11 having side and bottom steam jackets 12 and 13 and a stirrer 14. The stirrer 14 is carried on a vertical shaft 15 and is driven through bevel reduction gears 16 and 17 by a belt (not shown) which is shifted between the fast pulley 18 and the loose pulley 19 to start and stop the stirrer 14. The shaft 15 passes through a gland 21. All parts are very heavily constructed and may be lined or sheathed with acid-resisting material to resist injury caused by careless charging, though this last is not necessary if the charges are measured with reasonable care.

Steam from the jackets is taken from steam line 22 by branch steam line 23 equipped with reducing valve 24, gage 25 and stop valve 26. A trap 27 takes care of condensate from the jackets 12 and 13. A lubricator for the step bearing for shaft 15 is shown at 28.

In the top head of drum 11 is a charging door 29 which is hinged to a swinging bar 31, and is normally held sealed against a gasket by screwing down a nut-wheel 32 engaging bar 31. At the side near the bottom is a discharge door 33, hinged on pintle 34, and normally held sealed against a gasket, by a bar 35 also hinged on pintle 34 and clamped by nut-wheel 36.

Leading from the top of drum 11 is the vapor offtake 37 which leads to the catch-all or trap 38 near the top thereof, but below the baffles 39. The trap is in the shape of a vertically elongated cylindrical drum having a vacuum gage 41, cleanout opening 42 (normally closed) and normally closed valved drain connection 43.

Leading from the top of trap 38 above baffles 39 is the offtake connection 44 which leads to a jet condenser 45. This is of usual form and the condensing water connection appears at 46, water regulating valve at 47 and pump at 48. The pump is driven by steam taken from line 22 through branch 49, and throttle valve 51. The steam cylinder of the pump is lubricated by lubricator 52. The steam exhaust pipe appears at 53.

The preferred method of carrying out the process can now be described.

The first part of the charge, which comprises from 25% to 50% of the total, consists of feathers, dead stock, and preferably sodium sulfide. The proportions are one pound of sodium sulfide to each fifty pounds of feathers and dead stock. The drum is then sealed and the stirrer is rotated for about thirty minutes with steam at 70 to 75 pounds gage (315° to 320° F.) in the jackets and a vacuum of approximately 15 inches of mercury in the drier. By this time the feathers are dissolved and the dead stock is broken up.

The balance of the charge is then added, consisting of wet chicken manure and nitre cake in the proportions of 12 pounds of nitre cake to 250 pounds of manure. The drum is again sealed and the stirrer is rotated for about 2-1/2 hours with the same vacuum and jacket pressures. The times above given are based on experience with batches totaling about 3000 pounds each.

If the acid reagent was added in substantial excess the 2-1/2 hours drying period should be interrupted as soon as the charge has assumed the granular form to permit the addition of a neutralizing agent for most of the excess acid. Slaked lime is used for this purpose.

The relative proportions of feathers (with dead stock) to manure are subject to variation as stated but the quantities of sodium sulfide based on feathers and dead stock, and of nitre cake, based on manure, follow approximately the proportions stated. The final composition depends on the proportions above stated to be variable.

When the drying has been completed the condenser is shut down and the door 33 is opened, whereupon the stirrer discharges the dried material which then contains about 20% moisture. This material is spread on the floor to cool. A further chemical action ensues and this reduces the moisture content to about 10%.

The function of the catchall is to intercept vapors or other material which should not reach the jet condenser.

The resulting product is a good commercial fertilizer having nearly three times the fertilizer value of commercial sheep manure and more than twice the value of chicken manure dried in direct heat driers. The addition of the feathers is an important factor in the result as these contain approximately 16% of ammonia and the manure 4-1/2% to 6%. The proportion of feathers used thus materially affects the resulting compounds and differences in such proportions account for the divergence between the following two typical analyses:

Sample No. 1.

| | Per cent. |
|---|---|
| Available phosphoric acid | 2.70 |
| Water soluble nitrogen | 6.85 |
| Total nitrogen | 7.48 |
| Available potash | 2.08 |
| Nitrogen as ammonia | 8.98 |
| Moisture | 15.80 |

Sample No. 2.

| | Per cent. |
|---|---|
| Available phosphoric acid | 2.95 |
| Water soluble nitrogen | 7.26 |
| Total nitrogen | 9.16 |
| Available potash | 2.10 |
| Nitrogen as ammonia | 10.99 |
| Moisture | 18.38 |

There is thus considerable variation in the final product dependent on the proportions used.

What is claimed is,—

1. A process for producing fertilizer from material high in casein, such as poultry manure, which comprises acidifying such material and evaporating it to dryness.

2. A process for producing fertilizer from material high in casein, such as poultry manure, which comprises acidifying such material with a mineral acid reagent, evaporating to granular consistency, then adding an alkaline substance to neutralize partially the acidity, and evaporating to dryness.

3. A process for producing fertilizer from material high in casein, such as poultry manure, which comprises acidifying such material with nitre cake, evaporating to granular consistency, then adding an alkaline substance to neutralize partially the acidity, and evaporating to dryness.

4. A process for producing fertilizer from material high in casein, such as poultry manure, which comprises acidifying such material and evaporating it to dryness at subatmospheric pressure.

5. A process for producing fertilizer from material high in casein, such as poultry manure, which comprises acidifying such material and evaporating it to dryness at an absolute pressure of approximately 7-1/2 pounds per square inch and at a temperature of approximately 315° F.

6. A process for producing fertilizer from material high in casein, such as poultry manure, which comprises acidifying such material with nitre cake, evaporating to granular consistency, then adding an alkaline substance to neutralize partially the acidity, and evaporating to dryness, said evaporating steps being conducted at an absolute pressure of approximately 7-1/2 pounds per square inch and at a temperature of approximately 315° F.

7. A process for producing fertilizer which consists in dissolving poultry feathers in a solution of an alkaline sulfide, mixing therewith poultry manure and an acid reagent capable of reacting to convert the manure to a granular state, and evaporating the resulting mass to dryness.

8. A process for producing fertilizer which consists in dissolving poultry feathers in a solution of an alkaline sulfide, mixing therewith poultry manure and an acid reagent capable of reacting to convert the manure to a granular state, and evaporating the resulting mass to dryness under reduced pressure.

9. A process for producing fertilizer which consists in dissolving poultry feathers in a solution of an alkaline sulfide, mixing therewith poultry manure and an acid reagent capable of reacting to convert the manure to a granular state, and evaporating the resulting mass to dryness at an absolute pressure of approximately 7-1/2 pounds per square inch and a temperature of about 315° F.

10. A process for producing fertilizer which consists in dissolving poultry feathers in a solution of an alkaline sulfide; mixing therewith poultry manure and an acid reagent capable of reacting to convert the manure to a granular state; evaporating until the mass assumes a granular state; adding an alkaline substance in slightly less amount than is necessary to neutralize; and evaporating to dryness.

11. A process for producing fertilizer which consists in dissolving poultry feathers in a solution of an alkaline sulfide; mixing therewith poultry manure and an acid reagent capable of reacting to convert the manure to a granular state; evaporating until the mass assumes a granular state; adding an alkaline substance in slightly less amount than is necessary to neutralize; and evaporating to dryness under an absolute pressure of about 7-1/2 pounds per square inch and at a temperature of about 315° F.

12. A process for producing fertilizer which consists in dissolving poultry feathers in a solution of sodium sulfide; mixing therewith poultry manure high in casein, and nitre cake; evaporating until the mass assumes a granular state; adding an alkaline substance in slightly less amount than is necessary to neutralize; and evaporating to dryness.

13. A process for producing fertilizer which consists in dissolving poultry feathers in a solution of sodium sulfide; mixing therewith poultry manure high in casein, and nitre cake; evaporating until the mass assumes a granular state; adding an alkaline substance in slightly less amount than is necessary to neutralize; and evaporating to dryness under an absolute pressure of about 7-1/2 pounds and at a temperature approximating 315° F.

14. A fertilizer comprising the reaction product of poultry manure rich in casein and a mineral acid reagent.

15. A fertilizer comprising the reaction product of poultry manure rich in casein, and nitre cake.

In testimony whereof I have signed my name to this specification.

ANGUS MACLACHLAN.